(12) United States Patent
Roes

(10) Patent No.: US 9,067,329 B2
(45) Date of Patent: Jun. 30, 2015

(54) SYSTEM AND METHOD FOR BOTH SLICING AND HOLDING A FOOD PRODUCT

(76) Inventor: Alfons Mathilde Gunter Roes, Oud-Turnhot (BE)

( * ) Notice: Subject to any disclaimer, the term of this patent is extended or adjusted under 35 U.S.C. 154(b) by 134 days.

(21) Appl. No.: 12/674,510

(22) PCT Filed: Aug. 20, 2008

(86) PCT No.: PCT/EP2008/060899
§ 371 (c)(1),
(2), (4) Date: May 25, 2010

(87) PCT Pub. No.: WO2009/024586
PCT Pub. Date: Feb. 26, 2009

(65) Prior Publication Data
US 2011/0036218 A1    Feb. 17, 2011

(51) Int. Cl.
| | | |
|---|---|---|
| A47J 43/04 | (2006.01) |
| B26D 1/00 | (2006.01) |
| B26D 7/01 | (2006.01) |
| B26D 3/26 | (2006.01) |
| A23N 4/22 | (2006.01) |
| B26D 3/24 | (2006.01) |

(52) U.S. Cl.
CPC .. *B26D 3/26* (2013.01); *A23N 4/22* (2013.01); *B26D 3/245* (2013.01); *B26D 7/01* (2013.01)

(58) Field of Classification Search
CPC ............ A23N 4/22; B26D 3/245; B26D 3/26; B26D 7/01
USPC ................................ 99/549, 558; 83/870, 932
See application file for complete search history.

(56) References Cited

U.S. PATENT DOCUMENTS

| | | | |
|---|---|---|---|
| 2,383,814 A | 8/1945 | De Soto | |
| 2,824,588 A * | 2/1958 | Lyon et al. ...................... | 30/114 |
| 5,520,105 A * | 5/1996 | Healy .............................. | 83/932 |
| 6,347,580 B1* | 2/2002 | Huang ............................. | 99/504 |
| 7,086,155 B2* | 8/2006 | Chan et al. ...................... | 30/114 |
| 2006/0011027 A1 | 1/2006 | Chan et al. | |
| 2006/0254058 A1* | 11/2006 | Chang .............................. | 30/114 |

FOREIGN PATENT DOCUMENTS

| | | |
|---|---|---|
| GB | 856963 A | 12/1960 |
| GB | 2312613 | 11/1997 |

* cited by examiner

*Primary Examiner* — Stephen Choi
(74) *Attorney, Agent, or Firm* — Fish & Richardson P.C.

(57) ABSTRACT

Article of manufacture for holding sliced food, the article comprising an outer rim and a base provided therein, characterized in that the base comprises a number of cutting elements extending radially inward from the outer rim, each cutting element having a cutting edge.

1 Claim, 4 Drawing Sheets

SYSTEM AND METHOD FOR BOTH SLICING AND HOLDING A FOOD PRODUCT

CROSS REFERENCE TO PRIOR APPLICATIONS

This is a U.S. National Phase application under 35 U.S.C. §371 of International Patent Application No. PCT/EP2008/060899, filed Aug. 20, 2008, and claims the priority of European Patent Application No. 07114629.4, filed Aug. 20, 2007 both of which are incorporated by reference herein. The International Application published in English on Feb. 26, 2009 as WO 2009/024586 under PCT Article 21(2).

FIELD OF THE INVENTION

The present invention concerns an article of manufacture for holding sliced food.

BACKGROUND OF THE INVENTION

It is generally acknowledged that vegetables and fruit are vital part to healthy diet. This fact has gained importance in today's stressed climate where junk and fast food play is accounted for a high number of different diseases. As a response to this need, solutions are looked for which increases the consumption of vegetables and fruits in a fast and yet convenient way.

While it is known to slice food like an apple and to put the sliced parts in a cup, it is equally known that the slicing of food and putting it in a cup necessitates handling of the food after it has been sliced, which not only inconvenient in further handling but which is also unfavourable with respect to hygiene. In addition, both actions are needed which discourages people to effectively digest the sliced apple.

It is clear from the above that there remains a demand for a technical solution which not only motivates the consumer to digest more fruit and vegetables but also which does this in a convenient and hygienic way.

The present invention meets this demand by providing a specifically designed convenient food cup that allows for a less complex slicing method while still ensuring maximum hygiene.

The present invention is directed to an article of manufacture which provides for both a slicing and a holding function of the sliced food, a maximum hygiene level can be offered since no handling of the food is required post slicing. Furthermore, the cutting means are automatically replaced after each slicing operation thereby rendering the cleaning of the cutting means between two consecutive slicing operations redundant.

Prior art methods such as U.S. Pat. No. 3,696,847 discloses a device for slicing food articles comprising a) a cup that consists of a base and an inclined side wall provided with radial slits extending from the base to the outer edge and b) a rosette of cutting elements that can be moved up and down through said slits in the cup. When providing an article of food in the cup and consecutively moving the rosette of cutting elements down in the cup and through the slits, the article of food is sliced. Once the cutting elements are removed from the cup, the cup can be taken out of the device with the sliced food therein. An inconvenience of the US '847 assembly is that after each slicing movement, the cup has to be removed and replaced and the cutting elements have to be rinsed for reasons of hygiene.

It is clear that none of the prior art methods disclose nor suggest the presently claimed subject matter nor the benefits resulting from the present invention.

SUMMARY OF THE INVENTION

The present invention is directed to an article of manufacture for holding food, the article comprising an outer rim and a base provided therein, whereby the base comprises a number of cutting elements extending radial inwardly from the outer rim, each cutting element having a cutting edge.

DETAILED DESCRIPTION OF THE INVENTION

The present invention is directed to an article of manufacture for holding food, the article comprising an outer rim and a base provided therein, whereby the base comprises a number of cutting elements extending radial inwardly from the outer rim, each cutting element having a cutting edge directed in a longitudinal direction of the rim.

Since the article according to the present invention provides for both a slicing and a holding function of the sliced food, a maximum hygiene level can be offered since no handling of the food is required post slicing. Furthermore, the cutting means are automatically replaced after each slicing operation thereby rendering the cleaning of the cutting means between two consecutive slicing operations redundant.

Preferably, the outer rim of the article of manufacture at least partially extends beyond the cutting edges of the cutting elements. The extension of the outer rim beyond the cutting edges forms a spacing means between the cutting edges of the article of manufacture and a base whereon an article of food rests. As such a minimum distance is kept between the cutting edges and said base during the slicing operation. Keeping this distance prevents the food article to be entirely sliced and thus results in the sliced food article to be kept intact near one of its ends. Leaving one of the ends of the food article intact enhances the holding of the sliced food in the article of manufacture.

More preferably said minimum distance is smaller than 5 mm, such that the sliced parts can easily be broken of at their base for consumption. Indeed, when said distance is larger than 5 mm, breaking of the sliced parts may become difficult or the parts will tend to break of at a place distant from their base, thereby leaving an important part of the article of food attached to the article of manufacture.

In the case the food articles to be sliced are fruits with a hard or non-edible core, such as apples, the cutting elements are preferably provided between in inner rim and an outer rim, whereby the inner rim is provided with a cutting edge directed in a same direction as the cutting edges of the cutting elements, for removing the core out of the fruit.

The present invention also concerns a device for slicing an article of food, characterised in that in comprises an article of manufacture as defined here above.

Finally, the invention also concerns a method for slicing food, the method comprising providing an article of food on a base plate; reciprocally moving the base plate and an article of manufacture as identified above, thereby slicing the article of food; and maintaining a minimum distance between the base plate and slicing edges of the article.

BRIEF DESCRIPTION OF THE DRAWINGS

In order to better show the characteristics of the present invention a detailed description will a preferred embodiment will be given hereafter, as an example only, without limiting the scope of the present invention and with reference to the appended drawings, wherein:

FIG. 2 on a larger scale, represents the part indicated by P2 in FIG. 1a.

FIG. 3, on an enlarged scale, represents a cross-section according to line III-III in FIG. 1a.

DETAILED DESCRIPTION OF EMBODIMENT

Figure 1A:
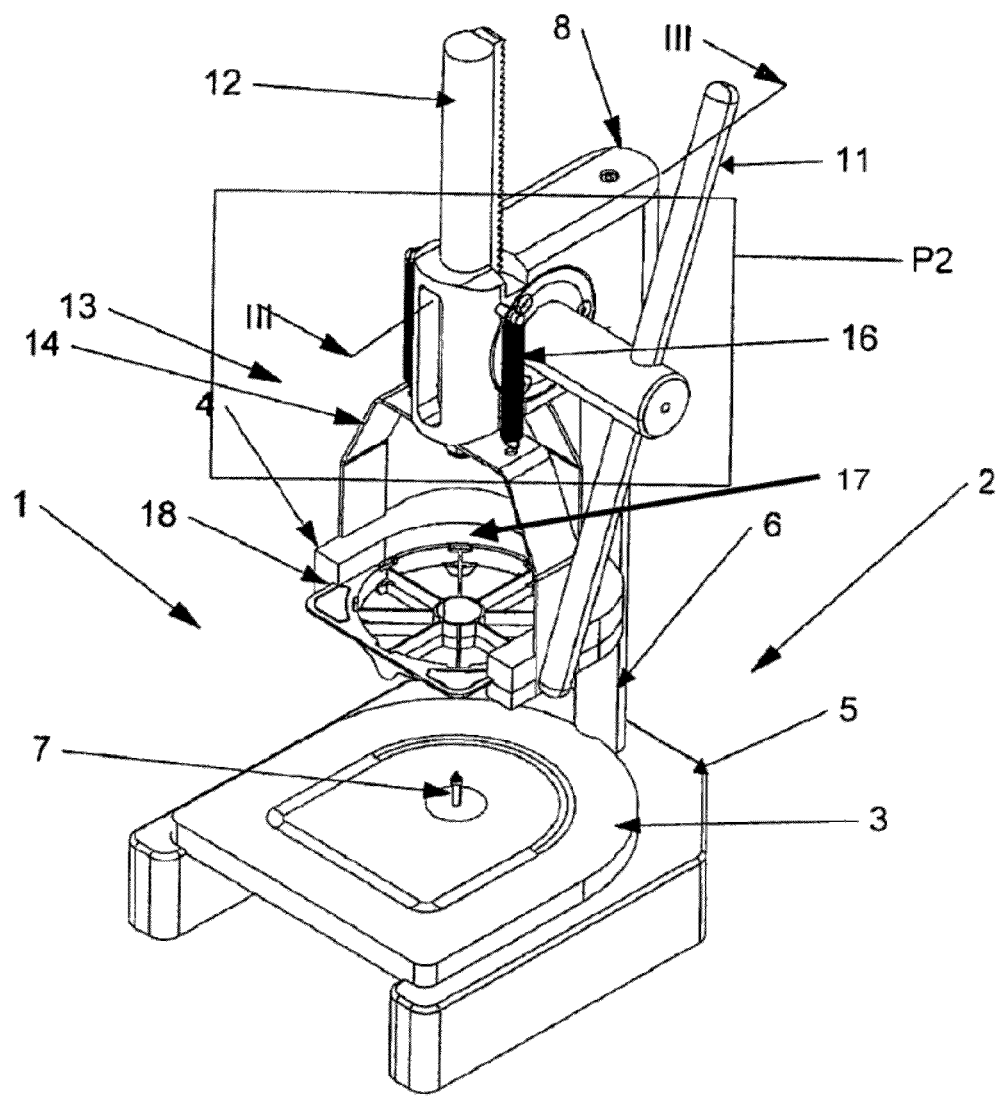
FIGS. 1a and 1b represent a device according to the present invention.
Figure 1B:
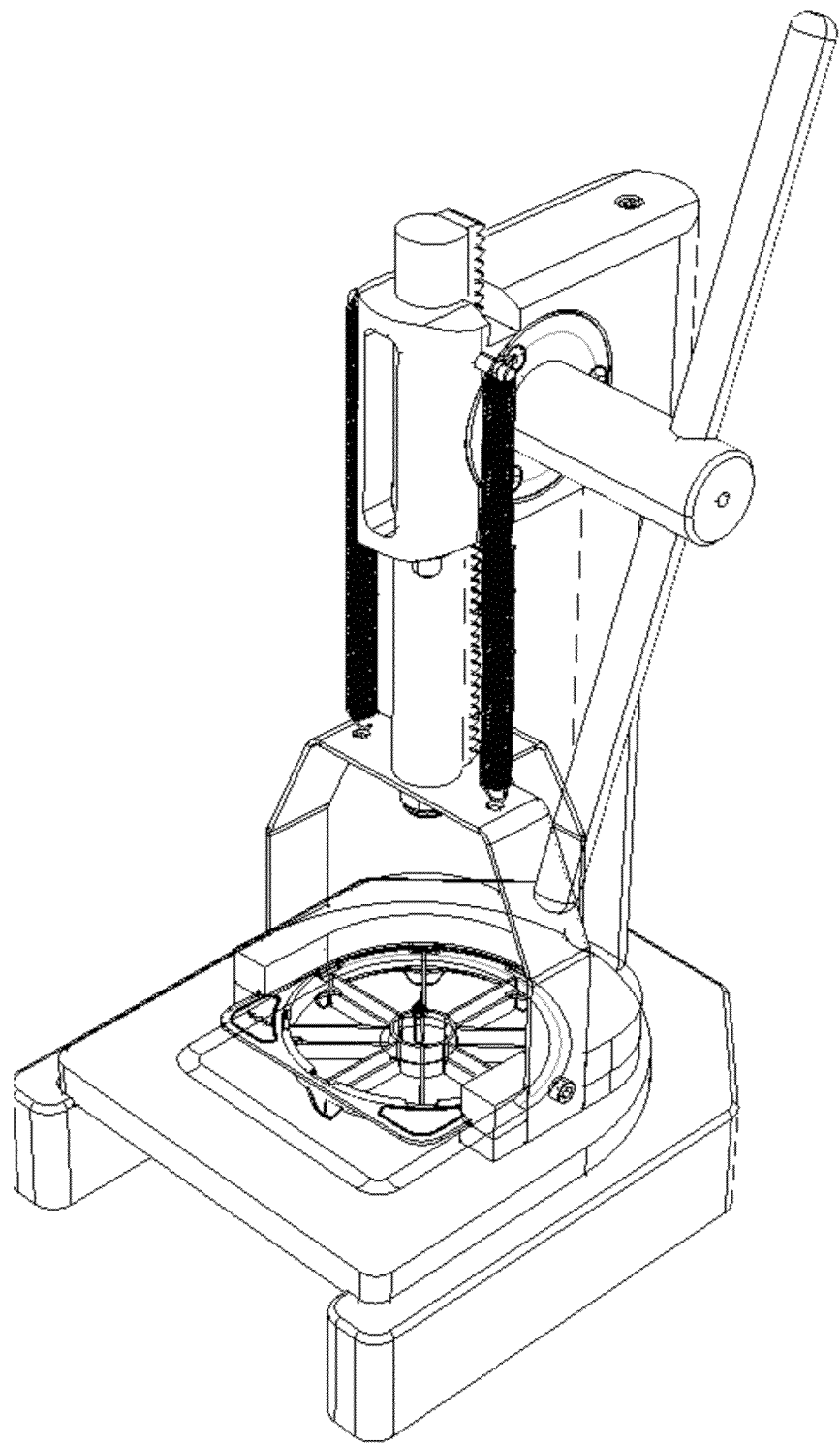
Figure 2:
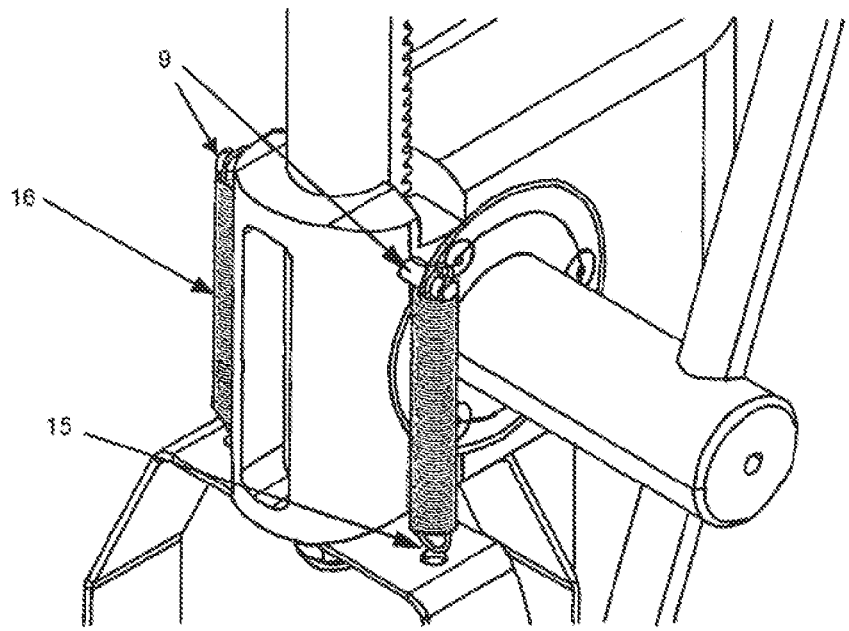
Figure 3:
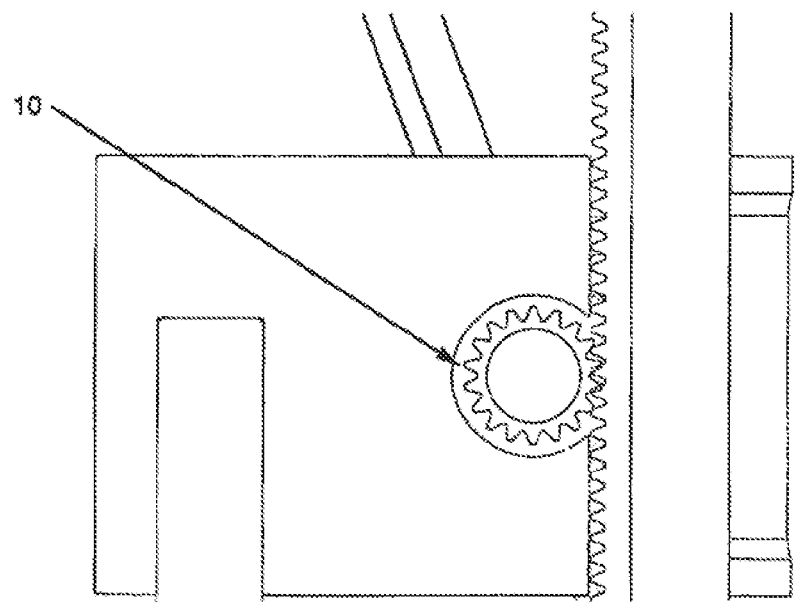

FIGS. 1 to 3 represent a device according to the invention, for slicing a food article, the device 1 essentially comprises a support 2; a base plate 3 and a retainer 4 and means for reciprocally moving the retainer and the base plate to and fro.

In the present embodiment, the support 2 essentially consists of a horse-shoe shaped base 5 whereon said base plate 3 is fixed and a upright standard 6.

A hole is drilled transversally through the base plate 3, with a pin 7 extending there through in an upward direction.

The means for reciprocally moving the retainer 4 and the base plate 3 are mounted in a housing 8 that is fixed on the free end portion of the upright standard 6. As represented in FIGS. 1 and 3 the housing 8 defines a chamber that is accessible through the side walls of the housing via two coaxial openings extending parallel to the base 2 and through a through hole that in this case extends transversally with respect to the base plate 3.

In this case the housing 6 further comprises two protrusions 9 extending parallel to base plate 3.

A gear 10 is journalled in the housing 8 such that it can rotate freely around its central shaft that extends in the above mentioned coaxial openings in the housing 8. The shaft of the gear 10 is preferably prolonged in one direction and cooperates with a handle 11 operable from the outside of the housing 8.

Through the hole in the housing 8 is provided a toothed rod 12 working in coordination with the above gear 10.

A holding unit 13 is mounted on the rod's 12 end portion that directed towards the base plate 3.

In the present embodiment, the holding unit 13 comprises a yoke 14 fixed to said rod 12, while said retainer 4 is fixed in the yoke 14. The yoke 14 is preferably provided with two lips 15 (FIG. 2) whereto springs 16 are attached that are both connected with their free ends to said protrusions 9 on the housing 8.

The retainer 4 comprises a horse-shoe shaped side wall 17 extending parallel to the base plate 3 and open in a direction opposite to the upright standard 6. A slot 18 is provided extending along the entire length at the inner side of the side wall 17.

Figure 4:
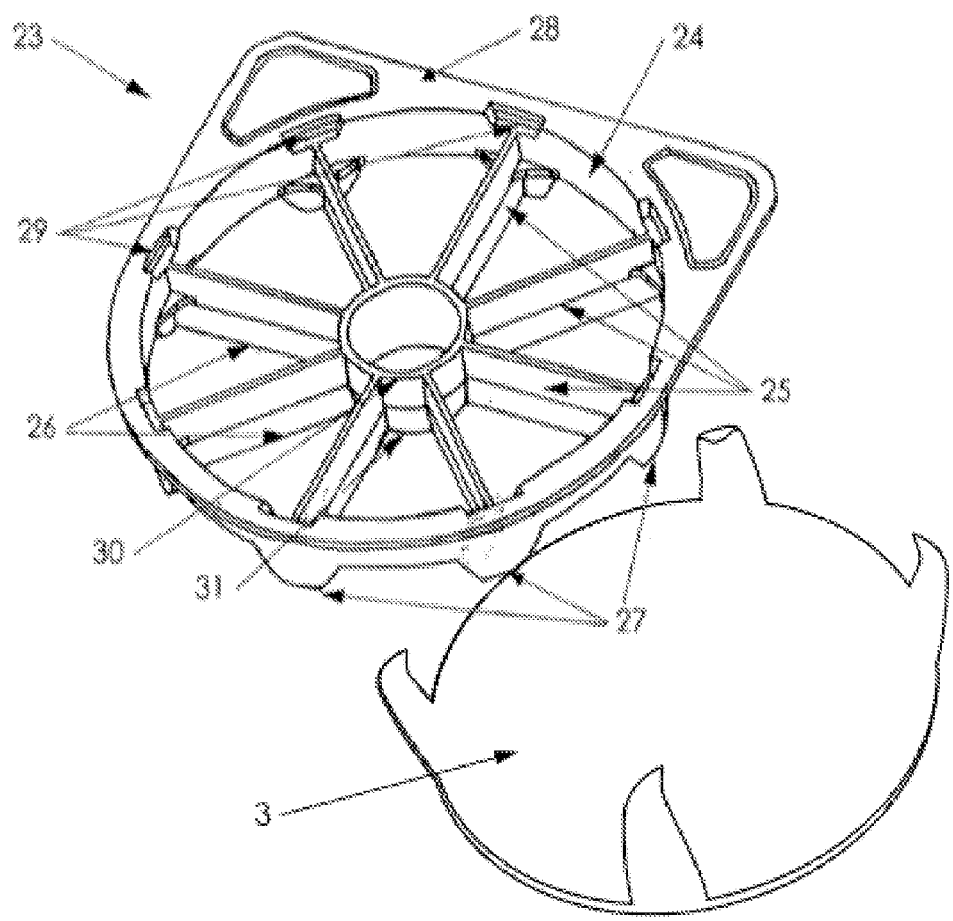
FIG. 4 represents a food cup according to the present invention.

Turning now to the article 23 of manufacture according to the invention and represented in FIG. 4, it is noted that it comprises an outer rim 24 and and a base provided therein. According to the invention, the base comprises a number of cutting elements 25 extending radially inward from the outer rim 24, each cutting element having a cutting edge 26 directed in a longitudinal direction of the rim 24.

Preferably, the outer rim 24 at least partially extends beyond the cutting edges 26 of the cutting elements 25. In this case this is achieved by providing several legs 27 on the outer rim 24. Opposite said legs 27, the outer rim is provided with a transversal outwardly extending flange 28 that is preferably prolonged at some discrete places around the rim, such that the flange 28 has a non-circular contour complementary to the slot 18 provided in the retainer 4.

In the embodiment according to FIG. 4, the flange 28 is extended at two distinct spots both positioned in a same half-section of the food cup 23.

The article is preferably provided with slots 29 provided in the border zone between the outer rim and the flange 28, which slots 29 correspond to the above mentioned legs 27 on the outer rim 24. It is clear that providing these slots allows a good stacking of the article of manufacture, thereby enhancing their packing and transport.

In the present embodiment the cutting elements 25 extend between the outer rim 24 and an inner rim 30 having a cutting edge 31. Preferably the cutting edges 26 of the several cutting elements are all situated at a same level in view of the outer rim 24. The cutting edge 31 of the inner rim 30 too is preferably situated at that same level.

In the present case, the outer rim 24 and inner rim 30 have a circular cross section. It is clear however, that the outer rim 24 and inner rim 30 can have cross sections of various shapes such as an oval cross section or a semi-circular cross section. Furthermore, the cross section of the outer rim 24 does not necessarily need to be of a same geometrical shape as the cross section of the inner rim 30.

The article is preferably manufactured of a plastic material such as for example POM and preferably is a one-piece article.

The working of the device according to the invention is simple and as follows.

In order to slice an article of food such as for example an apple, pear, peach or tomato, the retainer 4 is placed in a position at a maximum distance of the base plate (as represented in FIG. 1a) and the article of manufacture 23 is slid in the retainer 4 with the cutting edges 26 directed to the base plate 3. The retainer 4 is subsequently closed by means of the bridging element 19 that, in a closed off condition, is positioned above the corresponding part of the flange 28 of the article of manufacture. Since the flange of said article 23 and the complementary slot 18 in the retainer 4 are non-circular, the article 23 cannot turn or twist, nor slide once the retainer 4 is properly closed and locked.

Further, the article of food that is not represented in the drawings, is placed on the base plate 3, over the pin 7 that allows to hold the article of food in place during slicing.

Subsequently, the handle 11 is operated by rotation such that the gear 10 forces the toothed rod 12 downwards, thereby forcing the cutting elements 25 through the article of food such that it is sliced.

As illustrated in FIG. 1b, the downward movement of the retainer 4 will preferably be stopped once the legs 27 of the article's 23 outer rim 24 contact the base plate 3, thereby leaving a spacing between the cutting edges 26 and the base plate 3, such that the article of food is not entirely sliced but a portion of it remains uncut.

In this partially uncut state, the article of food will remain blocked in the article of manufacture 23 when this last is moved up again by operating handle 11 and will also remain blocked when the article of manufacture is removed from the retainer 4.

For the removal, a user can grip the article of manufacture 23 at the outwardly directed flange 28, or preferably the extensions thereof, thereby avoiding any direct contact with the sliced article of food while presenting the food to a consumer.

Further, it is remarked that a decoration or a child friendly promotion can be provided on the flange 28 and in particular the extensions thereof.

By providing a new (unused) article of manufacture 23 in the retainer 4, a next article of food can be sliced, without the need of cleaning the cutting elements or extensive cleaning of the device 1.

In fact, once a used article of manufacture with a sliced article of food resting therein is removed from the device, only the base plate 3 of that device has contacted the previously sliced article of food, whilst all other parts of the device do not directly contact any food and do not require extensive cleaning after every use.

It will be appreciated that, instead of the legs 27 provided on the outer rim 24 of the article of manufacture, other spacing means can be used to maintain a minimum distance between the cutting edges 26 and the base plate 3.

Indeed, it is also possible to provided protrusions on the base plate 3 that are positioned such that they co-operate with the outer rim 24 of the article of manufacture during the reciprocal movement of the article of manufacture towards the base plate 3. According to yet another embodiment, the spacing means can co-operate with the handle 11 or the gear 10, limiting their rotation to a point where the cutting edges 26 are positioned at a predetermined minimum distance of the base plate 3.

The predetermined minimum distance is preferably smaller than 5 mm since this is a good equilibrium between providing sufficient capacity to hold the article of food in the article of manufacture 23, while still allowing breaking loose the sliced parts of the article of food to eat them separately.

It is apparent that although in the above described embodiment, the article of manufacture 23 is moved towards the base plate 3, it is also possible to move the base plate 3 towards the article 23 or to move both parts 3 and 23 reciprocally.

Furthermore it is clear that the means for reciprocally moving the article of manufacture 23 and the base plate 3 can be designed according to a multitude of options generally known to a person skilled in the art.

In addition it is noted that for hygienic reasons, the base plate 3 can be made removable from the support 2. In this last case it is preferred to use a base plate with a contour corresponding to that of the article of manufacture and to provide it with a number of upstanding clips members that grasp behind the flange of the article of manufacture when both parts are moved towards each other.

In that case, the base plate 3 will be attached to the article of manufacture during the slicing operation and the base plate 3 will be removed from the device together with the article of manufacture. A further advantage of this last embodiment is that the base plate additionally serves as a collector of eventual jus leaking out of the sliced article of food. Clearly according the embodiment described above, the base plate can be considered as part of the article of manufacture according the present invention. The base plate 3 comprising connection means to the outer rim 24 of the article of manufacture.

The present invention is by no means limited to the preferred embodiments of the device and article of manufacture as described here above, but on the contrary can be made in multiple variations without leaving the scope of the present invention.

The invention claimed is:

1. A device for slicing an article of food which comprises:
   a. a retainer with an article of manufacture removably provided therein, the article of manufacture comprising an outer rim provided with at least one outwardly extending flange and a base provided therein, comprising a number of cutting elements extending radially inward from the outer rim, each cutting element having a cutting edge, said outer rim extending at least partially beyond the cutting edge of the cutting elements;
   b. a support with a base plate removably provided thereon having a number of upstanding clips members that grasp behind the flange of the article of manufacture; and
   means for reciprocally moving the article of manufacture and the base plate toward each other, thereby allowing slicing an article of food that was positioned on the base plate prior to moving the article of manufacture and base plate towards each other, the reciprocal movement limited to the level at which the outer rim of the article of manufacture contacts the base plate whereby the cutting edges of the cutting elements are facing the base plate but spaced apart from the base plate, such that a portion of the article of food remains uncut; the upstanding clip members of the base plate grasping behind the flange of the article of manufacture during reciprocal movement of the article of manufacture towards the base plate allowing removal of the article of manufacture and the base plate connected thereto from the device such that the article of manufacture and the base plate act as a food cup for the sliced article of food arranged thereon.

\* \* \* \* \*